United States Patent [19]

Davis

[11] 4,430,865
[45] Feb. 14, 1984

[54] METHOD FOR COOLING A PROCESS GAS STREAM

[75] Inventor: Robert B. Davis, Nyack, N.Y.

[73] Assignee: Union Carbide Corporation, Danbury, Conn.

[21] Appl. No.: 451,190

[22] Filed: Dec. 20, 1982

[51] Int. Cl.³ .............................................. F28C 1/00
[52] U.S. Cl. ....................................... 62/121; 62/70; 62/171
[58] Field of Search .................. 62/70, 121, 304, 306, 62/171, 380

[56] References Cited

U.S. PATENT DOCUMENTS

| | | | |
|---|---|---|---|
| 3,583,172 | 6/1971 | Koudelka et al. | 62/70 |
| 3,672,182 | 6/1972 | Stowasser et al. | 62/70 |
| 3,730,201 | 5/1973 | Lefever | 62/55 |
| 4,090,369 | 5/1978 | LeDiouron | 62/380 |

*Primary Examiner*—Ronald C. Capossela
*Attorney, Agent, or Firm*—Saul R. Bresch

[57] ABSTRACT

In a method for cooling a process gas stream with a liquid cryogen, said stream being recycled through a pipe in a closed system comprising a reactor containing at least one pipe wherein, at the initiation of the instant method:

(i) the flowrate of the stream is in the range of about 10,000 scfm to about 350,000 scfm;
(ii) the temperature of the stream is in the range of about 75 degrees F. to about 450 degrees F.; and
(iii) the pressure of the system is in the range of about 150 psig to about 1000 psig;

and wherein, at any time during the effectuation of the instant method:

(iv) the temperature differential between any two points in the pipe separated by at least about eight times the nominal pipe diameter is no greater than about 200 degrees F.; and (v) the minimum temperature of the pipe is at least about minus 20 degrees F., the improvement comprising adjusting the flowrate of the liquid cryogen, which is introduced into the pipe at about the midpoint between the two points referred to in paragraph (iv), above, counter to the direction of the stream, in accordance with the following equations:

(a) when the downstream temperature, T2, is above minus 20° F.:

$$A = \frac{B \times C \times (T1 - T2)}{D + [E \times (T2 - T3)]}$$

(b) when the downstream temperature, T2, reaches minus 20° F.:

$$A = \frac{B \times C \times (T1 + 20)}{D + [E \times (-20 - T3)]}$$

wherein:

A = flowrate of liquid cryogen into pipe in pounds per hour
B = stream flow upstream of point of introduction of liquid cryogen in pounds per hour
C = heat capacity of stream upstream of point of introduction of liquid cryogen in BTU's per pound per degree F.
D = heat of vaporization of liquid cryogen in BTU's per pound
E = heat capacity of nitrogen vapor in BTU's per pound per degree F.
T1 = stream temperature in degrees F. measured at a distance of at least about three times the nominal pipe diameter upstream from the point of introduction of liquid cryogen
T2 = combined stream and cryogen temperature in degrees F. measured at a distance of at least about five times the nominal pipe diameter downstream from the point of introduction of liquid cryogen
T3 = saturation temperature of liquid cryogen in degrees F.

2 Claims, No Drawings

METHOD FOR COOLING A PROCESS GAS STREAM

DESCRIPTION

1. Technical Field

This invention relates to a method for cooling a process gas stream with a liquid cryogen.

2. Background Art

Reactors, such as hydrotreaters, normally used in refineries, are large catalyst filled thick-walled vessels, generally designed to operate at high temperatures in the range of about 800° to about 1000° F. and at high pressures in the range of about 600 to about 1500 pounds per square inch gauge (psig). Typical reactors are about 60 feet high and 10 feet in diameter, and have a wall which is about 3 inches thick. Their piping systems are essentially closed, i.e., they form a closed loop, and are welded to minimize potential gas (in the case of hydrotreaters, hydrogen) leakage except for the valves, which are flanged to facilitate removal for maintenance purposes. The piping is fabricated from materials such as carbon steel or nine percent chrome steel, both of which are subject to cracking or failure when subjected to low temperatures.

During a plant turn around, one of the key steps involves the cooldown of the reactor for a catalyst change. Ideally, these big reactors should be cooled to about 100° F. or less to allow personnel to effectively work inside. The reactor can be cooled quite rapidly from above 900° F. to about 300° F. by using the system recycle compressor and heat exchanging against cooling water. However, as the reactor temperature moves into the range below about 300° F., the time required for further cooling increases drastically. This occurs as the reactor temperature approaches the recycle gas discharge temperature, which may exceed about 120° F.

Coincidentally with the slowdown in cooling, it usually becomes necessary, particularly where reactive gases such as hydrogen are concerned, to purge the system at about 300° F. replacing the reactive gas with an inert gas, nitrogen, for example. This prevents the formation of undesirable organometallic complexes, such as nickel carbonyl, and provides an inert working atmosphere.

In order to expedite the cooling of the reactor from 300° F. to 100° F. with maximum refrigeration and provide an inert atmosphere also, it is desirable to introduce nitrogen as a liquid into the reactor piping system and vaporize it in the recycle stream. During the procedure, however, risk to the piping and the reactor vessel itself of overcooling, either by cooling too quickly or cooling to too low a temperature, must be minimized and, preferably, eliminated.

DISCLOSURE OF INVENTION

An object of the invention, therefore, is to provide a method for cooling process gas streams, such as those that flow through the piping systems of large reactors, in such a manner that the cooling rate is maximized while avoiding overcooling, particularly the kind of overcooling which causes excessive temperature differentials.

Other objects and advantages will become apparent hereinafter.

According to the present invention, an improvement has been discovered in a method for cooling a process gas stream with a liquid cryogen, said stream being recycled through a pipe in a closed system comprising a reactor containing at least one pipe wherein, at the initiation of the instant method:

(i) the flowrate of the stream is in the range of about 10,000 standard cubic feet per minute (scfm) to about 350,000 scfm;

(ii) the temperature of the stream is in the range of about 75 degrees F. to about 450 degrees F.; and (iii) the pressure of the system is in the range of about 150 psig to about 1000 psig;

and wherein, at any time during the effectuation of the instant method;

(iv) the temperature differential between any two points in the pipe separated by at least about eight times the nominal pipe diameter is no greater than about 200 degrees F.; and (v) the minimum temperature of the pipe is at least about minus 20 degrees F.

The improvement comprises adjusting the flowrate of the liquid cryogen, which is introduced into the pipe at about the midpoint between the two points referred to in paragraph (iv), above, counter to the direction of the stream, in accordance with the following equations:

(a) when the downstream temperature, T2, is above minus 20° F.:

$$A = \frac{B \times C \times (T1 - T2)}{D + [E \times (T2 - T3)]}$$

(b) when the downstream temperature, T2, reaches minus 20° F.:

$$A = \frac{B \times C \times (T1 + 20)}{D + [E \times (-20 - T3)]}$$

wherein:

A = flowrate of liquid cryogen into pipe in pounds per hour

B = stream flow upstream of point of introduction of liquid cryogen in pounds per hour C = heat capacity of stream upstream of point of introduction of liquid cryogen in BTU's per pound per degree F.

D = heat of vaporization of liquid cryogen in BTU's per pound

E = heat capacity of nitrogen vapor in BTU's per pound per degree F.

T1 = stream temperature in degrees F. measured at a distance of at least about three times the nominal pipe diameter upstream from the point of introduction of liquid cryogen T2 = combined stream and cryogen temperature in degrees F. measured at a distance of at least about five times the nominal pipe diameter downstream from the point of introduction of liquid cryogen T3 = saturation temperature of liquid cryogen in degrees F.

DETAILED DESCRIPTION

The reactors of concern here have a recycle line or pipe which forms a closed loop, for passing fluids, usually gases, through the system to participate in the catalytic reaction, which is to be carried out in the reactor; for temperature control; or for the purposes of purging the system. The liquid cryogen used to cool down the system is preferably liquid nitrogen, but other inert liquified gases can be used such as argon or helium. The injection of the liquid cryogen into the recycle line usually made where there is a flanged valve or elbow. The preferred mode is to substitute a spool piece in place of the flanged valve or elbow, the spool piece being an inlet through which the liquid cryogen can be introduced counter to the direction of the recycle stream. The injection of cryogen is usually automated or semi-automated since the cooling process is a twenty-four hour per day operation and, in the manual mode, the operation may suffer from operator inattention.

The injection is controlled by inserting thermocouples into the recycle stream at two points separated by at least about eight times the nominal pipe diameter and preferably no less than about 6 times the diameter. The thermocouples at each point are connected to a temperature indicator and both sets of thermocouples are attached to a differential temperature controller, which has a range of at least 0° to 180° F. This controller is the heart of an automated system since it regulates the temperature differential between the upstream and downstream temperatures. The amount of liquid nitrogen injected is adjusted to maintain a given temperature drop in the recycle stream, which, as noted above, is selected to maximize cooling rate while preventing damage to the reaction vessel and the piping system. The operation of a preferred control system is described as follows: The set point of the differential temperature controller is initially set at a value less than that ultimately desired. For example, if a 100° F. differential is the objective, the controller might be set for 50° F. The liquid nitrogen flow is started and is increased until the indicated differential is about 50° F. and the controller is maintaining this differential. Nitrogen flow in excess of that required to maintain the differential temperature is automatically bypassed through a pneumatic control valve back to the storage tank or vented. The controller set point is gradually increased, along with the nitrogen flow, until the desired differential temperature is reached. The nitrogen flow rate is periodically checked to insure that a large excess flow is not being bypassed or vented. If a centrifugal pump is used instead of a positive displacement pump, the pneumatic control valve can be located directly on the pump discharge. Suitable warning lights, alarms, and blow-offs are provided to prevent overcooling and overpressuring of the system.

The spool piece, mentioned above, is inserted together with a sleeve on either end of the spool into the piping to replace the existing flanged valve. The parts are made of AISI 300 series stainless steel or other similar alloys suitable for cryogenic temperature service and to protect against the corrosive action of the process stream. The sleeves are preferably long enough to extend into the piping beyond the points at which the thermocouples are placed. The sleeves and spool together provide a measure of low temperature protection for the piping in the liquid cryogen/process stream mixing zone. The spool piece also provides upstream and downstream access for the control and monitoring thermocouples. A static mixing element may also be included in the downstream sleeve to promote good mixing and subsequent vaporization of the liquid cryogen. The same spool/sleeves combination can be used to replace a flanged elbow except that a "tee" shaped spool is used rather than the "eye" shaped spool, which is used to replace the flanged valve.

Referring to the equation in paragraph (a), above, if most of the reactive gas in the recycle stream is replaced by nitrogen such that the average molecular weight of the stream is about 28, then the equation may be simplified as follows:

$$A = \frac{B \times (T_1 - T_2)}{\left(\frac{D}{C}\right) + (T_2 - T_3)}$$

Under the same circumstances, the equation referred to in paragraph (b), above, simplifies to:

$$A = \frac{B \times (T_1 + 20)}{\left(\frac{D}{C}\right) + (-20 - T_3)}$$

The invention is illustrated by the following example:

EXAMPLE

Subject process is carried out using the preferred equipment, steps, and conditions mentioned above. The process gas stream is essentially pure nitrogen. The flowrate of the stream at initiation of the process is 200,000 pounds per hour; the temperature of the stream is 240° F.; and the pressure of the system is 450 psig.

The nominal pipe diameter is 10 inches; the separation between the thermocoupled points is 96 inches; and the desired temperature differential between these points is 100° F. The minimum temperature of the pipe is 0° F. The objective is to cool the stream from 240° F. to 140° F.

In this case, the equation used is:

$$A = \frac{B \times (T_1 - T_2)}{\left(\frac{D}{C}\right) + (T_2 - T_3)}$$

B = 200,000 pounds per hour
C = 0.25 BTU per pound per degree F.
D = 63.5 BTU's per pound
T1 = 240° F.
T2 = 140° F.
T3 = minus 269° F.
Therefore, A = 30,166 pounds per hour

I claim:

1. In a method for cooling a process gas stream with a liquid cryogen, said stream being recycled through a pipe in a closed system comprising a reactor containing at least one pipe wherein, at the initiation of the instant method:
   (i) the flowrate of the stream is in the range of about 10,000 scfm to about 350,000 scfm;
   (ii) the temperature of the stream is in the range of about 75 degrees F. to about 450 degrees F.; and
   (iii) the pressure of the system is in the range of about 150 psig to about 1000 psig;

and wherein, at any time during the effectuation of the instant method:
   (iv) the temperature differential between any two points in the pipe separated by at least about eight times the nominal pipe diameter is no greater than about 200 degrees F.; and
   (v) the minimum temperature of the pipe is at least about minus 20 degrees F., the improvement comprising adjusting the flowrate of the liquid cryogen, which is introduced into the pipe at about the midpoint between the two points referred to in paragraph (iv), above, counter to the direction of the stream, in accordance with the following equations:

(a) when the downstream temperature, T2, is above minus 20° F.:

$$A = \frac{B \times C \times (T1 - T2)}{D + [E \times (T2 - T3)]}$$

(b) when the downstream temperature, T2, reaches minus 20° F.:

$$A = \frac{B \times C \times (T1 + 20)}{D + [E \times (-20 - T3)]}$$

wherein:
A = flowrate of liquid cryogen into pipe in pounds per hour
B = stream flow upstream of point of introduction of liquid cryogen in pounds per hour
C = heat capacity of stream upstream of point of introduction of liquid cryogen in BTU's per pound per degree F.
D = heat of vaporization of liquid cryogen in BTU's per pound
E = heat capacity of nitrogen vapor in BTU's per pound per degree F.
T1 = stream temperature in degrees F. measured at a distance of at least about three times the nominal pipe diameter upstream from the point of introduction of liquid cryogen
T2 = combined stream and cryogen temperature in degrees F. measured at a distance of at least about five times the nominal pipe diameter downstream from the point of introduction of liquid cryogen
T3 = saturation temperature of liquid cryogen in degrees F.

2. The method defined in claim 1 wherein the average molecular weight of the stream is about equal to the molecular weight of the cryogen; the equation set forth in paragraph (a) is as follows:

$$A = \frac{B \times (T1 - T2)}{\left(\frac{D}{C}\right) + (T2 - T3)}$$

and the equation set forth in paragraph (b) is as follows:

$$A = \frac{B \times (T1 + 20)}{\left(\frac{D}{C}\right) + (-20 - T3)}$$

* * * * *